United States Patent
Robinson (10) Patent No.: US 8,930,680 B2
(45) Date of Patent: Jan. 6, 2015

(54) SYNC-ID FOR MULTIPLE CONCURRENT SYNC DEPENDENCIES IN AN OUT-OF-ORDER STORE QUEUE

(75) Inventor: Eric F. Robinson, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 967 days.

(21) Appl. No.: 11/963,043

(22) Filed: Dec. 21, 2007

(65) Prior Publication Data

US 2009/0164729 A1 Jun. 25, 2009

(51) Int. Cl.
 G06F 9/30 (2006.01)
 G06F 9/40 (2006.01)
 G06F 15/00 (2006.01)
 G06F 9/38 (2006.01)
 G06F 12/08 (2006.01)

(52) U.S. Cl.
 CPC .......... *G06F 12/0875* (2013.01); *G06F 9/3857* (2013.01); *G06F 9/3834* (2013.01); *G06F 12/0897* (2013.01); *G06F 9/3851* (2013.01)
 USPC ....................................... 712/218

(58) Field of Classification Search
 USPC ....................................... 712/218
 See application file for complete search history.

(56) References Cited

U.S. PATENT DOCUMENTS

| | | | |
|---|---|---|---|
| 6,308,245 B1 | 10/2001 | Johnson et al. | |
| 6,378,124 B1 | 4/2002 | Bates et al. | |
| 6,481,251 B1 | 11/2002 | Meier et al. | |
| 6,834,058 B1 | 12/2004 | Moyal et al. | |
| 7,058,049 B2* | 6/2006 | Tanaka et al. | 370/383 |
| 7,143,122 B2 | 11/2006 | Burton et al. | |
| 7,164,676 B1 | 1/2007 | Chakraborty | |
| 7,472,260 B2* | 12/2008 | Lien et al. | 712/225 |
| 7,493,615 B2* | 2/2009 | Gewirtz et al. | 718/100 |
| 7,500,087 B2* | 3/2009 | Saha | 712/235 |
| 2002/0124042 A1 | 9/2002 | Melamed et al. | |
| 2004/0216125 A1 | 10/2004 | Gazda et al. | |
| 2005/0060413 A1 | 3/2005 | Oyadomari et al. | |
| 2006/0005110 A1 | 1/2006 | Nango et al. | |
| 2006/0085604 A1* | 4/2006 | Guthrie et al. | 711/141 |
| 2006/0212868 A1 | 9/2006 | Takayama et al. | |
| 2009/0164734 A1 | 6/2009 | Robinson | |

OTHER PUBLICATIONS

Rajwar et al.; Transactional Lock-Free Execution of Lock-Based Programs; Oct. 2002; ASPLOS '02; pp. 5-17.*
Faherty, C., Office Action dated May 13, 2010; U.S. Appl. No. 11/963,221.

(Continued)

*Primary Examiner* — Corey S Faherty
(74) *Attorney, Agent, or Firm* — Yudell Isidore PLLC; Yuanmin Cai (57) ABSTRACT

A method, system and process for retiring data entries held within a store queue (STQ). The STQ of a processor cache is modified to receive and process multiple synchronized groups (sync-groups). Sync groups comprise thread of execution synchronized (thread-sync) entries, all thread of execution synchronized (all-thread-sync) entries, and regular store entries (non-thread-sync and non-all-thread-sync). The task of storing data entries, from the STQ out to memory or an input/output device, is modified to increase the effectiveness of the cache. Sync-groups are created for each thread and tracked within the STQ via a synchronized identification (SID). An entry is eligible for retirement when the entry is within a currently retiring sync-group as identified by the SID.

17 Claims, 9 Drawing Sheets

(56) References Cited

OTHER PUBLICATIONS

Gharachorloo et al., 'Memory Consistency and Event Ordering in Scalable Shared-Memory Multiprocessors'; 1990; IEEE; pp. 15-26.

Faherty, C., Final Office Action dated Aug. 24, 2010; U.S. Appl. No. 11/963,221.

Faherty, C., Advisory Action dated Nov. 8, 2010; U.S. Appl. No. 11/963,221.

* cited by examiner

SYNC-ID FOR MULTIPLE CONCURRENT SYNC DEPENDENCIES IN AN OUT-OF-ORDER STORE QUEUE

CROSS-REFERENCE TO RELATED APPLICATIONS

The present application is related to the following co-pending U.S. patent application filed on even date herewith incorporated herein by reference in its entirety:

Ser. No. 11/963,221, entitled "Multiple Concurrent Sync Dependencies In An Out-Of-Order Store Queue".

BACKGROUND

1. Technical Field

The present invention generally relates to processors and in particular to a technique for enhancing operations within a processor.

2. Description of the Related Art

A processor is a digital device that executes instructions specified by a computer program. A typical computer system includes a processor coupled to a system memory that stores program instructions and data to be processed by the program instructions. High level processor instruction execution may be broken down into three main tasks: (1) loading data into the upper level cache from memory or an input/output (I/O) device; (2) performing arithmetic operations on the data loaded from memory; and (3) storing the results out to memory via a lower level cache, or to an I/O device.

Of the three main tasks for processor instruction execution, storing, or writing the data to the memory (or I/O device) is the most flexible in regards to the latency of completing the task. Therefore, when there is a simultaneous request to access the upper level cache for loading and a request to access the upper level cache for storing, the loading operation is typically chosen to proceed prior to the storing operation. If multiple requests are made to load data, a request to store data to the cache may occur on consecutive processor execution cycles without success. The most common method of handling the occurrence of waiting to store data to the cache is to utilize a store queue (STQ). A STQ holds the data to be stored while waiting to access the cache.

Some STQs allow more recently processed data to write (or store) to the cache before data that has been waiting longer to be written to the cache. The process of younger data retiring (i.e. writing data into the cache) before older data retiring is known as out-of-order (OoO) operations. OoO STQs may introduce data integrity problems also known as store ordering hazards. For example, in a store ordering hazard, a younger data store to a given address may be retired prior to an older store to the same address. The data integrity problems resulting from the OoO STQ may result in a violation of the sequential execution model that is standard in processor architecture.

Dependency vectors are a method of processing data stores that addresses the problems of an OoO STQ. Although dependency vectors are able to fully and concurrently handle multiple synchronizing operations within an OoO STQ, dependency vectors do not scale well to larger (e.g., greater than sixteen entry vectors) STQs. This lack of scalability when using dependency vectors in large STQs increases the area and power costs of the processor more than is desired.

SUMMARY OF ILLUSTRATIVE EMBODIMENTS

Disclosed are a method, system and processor architecture for retiring data entries held within a store queue (STQ). The STQ of a processor cache is modified to receive and process multiple synchronized groups (sync-groups). Sync groups comprise thread of execution synchronized (thread-sync) entries, all thread of execution synchronized (all-thread-sync) entries, and regular store entries (non-thread-sync and non-all-thread-sync). The task of storing data entries from the STQ is modified to increase the effectiveness of the STQ. Sync-groups are created for each thread and tracked within the STQ via a synchronized identification (SID). An entry is eligible for retirement when the entry is within a currently retiring sync-group as identified by the SID.

In one embodiment, each entry entering the STQ is assigned a SID. The SID allocated to each entry corresponds to the entry's assigned sync-group. The bits of the SID for an entry are tracked within a STQ data table. A register, such as the sync ID-retirement (SIDR) (also known as a SIDR counter), is utilized per thread of execution to help identify when an entry is eligible for retirement. When the bits of the SID field match the bits of the SIDR, the entry may be eligible for retirement.

In one embodiment, entries allocated to the STQ are assigned an all-thread-sync (ATS) bit. The ATS bit is assigned per sync-group. Prior to a store retiring, the ATS bit of the store should match the ATS bit of the sync-group that is currently retiring. An all-thread-sync retirement (ATSR) bit is utilized during entry retirement. When the bits of the SID field and the bits of the SIDR match for a given entry (within the same thread), and the bits of the ATS and ATSR field match for the same entry (within the same thread), the entry is eligible to retire.

In one embodiment, a thread-sync store, all-thread-sync store, and non-thread sync store may retire from the STQ. A regular store and thread-sync store are eligible for retirement if the SID field matches the SIDR for the given thread, and the ATS bit of the store matches the current ATSR bit. When each store within a given thread-sync group retires from the STQ, then the bits of the SIDR (for the thread of execution) are incremented (plus one) to the next value. Incrementing the bits of the SIDR to the "next" value allow subsequent sync-groups to retire. An all-thread-sync store is eligible for retirement when the ATS bit of the store matches the current ATSR bit. When the all-thread-sync group retires, the ATSR bit is inverted. Inverting the ATSR bit allows subsequent sync-groups to retire.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and processor architecture for retiring data entries held within a store queue (STQ). The STQ of a processor cache is modified to receive and process multiple synchronized groups (sync-groups). Sync groups comprise thread of execution synchronized (thread-sync) entries, all thread of execution synchronized (all-thread-sync) entries, and regular store entries (non-thread-sync and non-all-thread-sync). The task of storing data entries, from the STQ, is modified to increase the effectiveness of the cache. Sync-groups are created for each thread and tracked within the STQ via a synchronized identification (SID). An entry is eligible for retirement when the entry is within a currently retiring sync-group as identified by the SID.

In one embodiment, each entry entering the STQ is assigned a SID. The SID allocated to each entry corresponds to the entry's assigned sync-group. The bits of the SID for an entry are tracked within a STQ data table. A counter, such as the sync ID-retirement (SIDR) counter, is utilized per thread of execution to help identify when an entry is eligible for retirement. When the bits of the SID field match the bits of the SIDR counter, the entry may be eligible for retirement.

In one embodiment, entries allocated to the STQ are assigned an all-thread-sync (ATS) bit. The ATS bit is assigned per sync-group. Prior to a store retiring, the ATS bit of the store should match the ATS bit of the sync-group that is currently retiring. An all-thread-sync retirement (ATSR) bit is utilized during entry retirement. When the bits of the SID field and the bits of the SIDR counter match for a given entry (within the same thread), and the bits of the ATS and ATSR field match for the same entry (within the same thread), the entry is eligible to retire.

In one embodiment, a thread-sync store, all-thread-sync store, and non-thread sync store may retire from the STQ. A regular store and thread-sync store are eligible for retirement if the SID field matches the SIDR counter for the given thread, and the ATS bit of the store matches the current ATSR bit. When each store within a given thread-sync group retires from the STQ, then the bits of the SIDR counter (for the thread of execution) are incremented (plus one) to the next value. Incrementing the bits of the SIDR buffer to the "next" value allows subsequent sync-groups to retire. An all-thread-sync store is eligible for retirement when the ATS bit of the store matches the current ATSR bit. When the all-thread-sync group retires, the ATSR bit is inverted. Inverting the ATSR bit allows subsequent sync-groups to retire.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term "store(s)" may be utilized to describe a data entry within the store queue. The terms "store" and "data entry" are utilized interchangeably. The following terms are utilized to describe the types of stores utilized herein: non-synchronized (non-sync), thread of execution synchronized (thread-sync), and all thread of execution synchronized (all-thread-sync). The term "retire" refers to writing a store from the STQ. "Allocate or allocated" is a term utilized herein to refer to the action of moving a new store that is entering the STQ into an available STQ entry.

Figure 1:
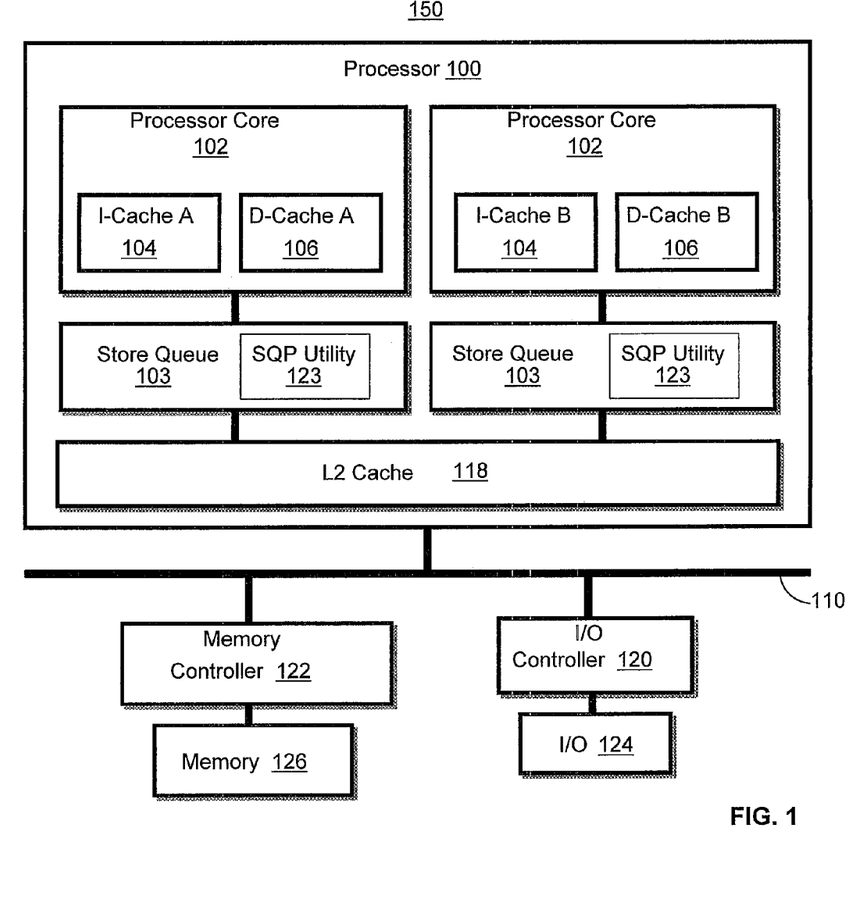
FIG. 1 is a block diagram of a multi-processor data processing system according to one embodiment of the invention.

With reference now to the figures, FIG. 1 depicts a block diagram representation of a multi-processor data processing system (DPS). DPS 150 comprises processor 100 having one or more processor cores 102. Processor cores 102 utilize instruction cache (I-cache) 104 as a buffer between external memory and processor cores 102. Data cache (D-cache) 106 of processor cores 102 receives data from memory 126. I-cache 104 and D-cache 106 are level 1 (L1) caches that share level 2 (L2) cache 118. I-cache 104 and D-cache 106 are coupled to L2 cache 118, which operates as a memory cache external to the processor core. Store queue 103 comprises store queue processing (SQP) utility (or logic) 123. Store queue 103 processes store requests from processor core 102.

Processor 100 is connected to memory controller 122 and I/O controller 120 via interconnect (system bus) 110 by which processor 100 communicates with memory 126, I/O devices 124, and other peripheral devices. Interconnect 110 may be a bifurcated bus with a data bus for routing data and a separate address bus for routing address transactions and other operations. Processor 100 communicates with main memory 126 via L2 cache 118 which is coupled to memory controller 122 via system interconnect 110. Memory controller 122 may be configured to manage the transfer of data between L2 cache 118 and main memory 126. Processor 100 may also include a level 3 (L3) directory (not illustrated). The L3 directory may be on or off chip with access to an off chip L3 cache. While the present invention is described with specific reference to the L2 cache in communication with store queue (STQ) 103 within a multi-level cache architecture, the cache architecture need not be a multi-level one or the number of levels may be greater than three.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The processor chip depicted in FIG. 1 may be, for example, an IBM Power processor, a product of International Business Machines Corporation in Armonk, N.Y.

Among the code/instructions/logic provided by SQP utility 123, and which are specific to the invention, are: (a) code/logic for receiving and processing multiple synchronized groups (sync-groups) within STQ 103; and (b) code/logic for processing stores within the STQ 103 according to a synchronized identification (SID). For simplicity of the description, the collective body of code/logic that enables these various features is referred to herein as SQP utility 123. According to the illustrative embodiment, various features of the invention are carried out by logic components on processor 100 and SQP utility 123. SQP utility 123 initiates a series of functional processes that enable the above functional features as well as additional features/functionality, which are described below within the description of FIGS. 2-9.

Figure 2:
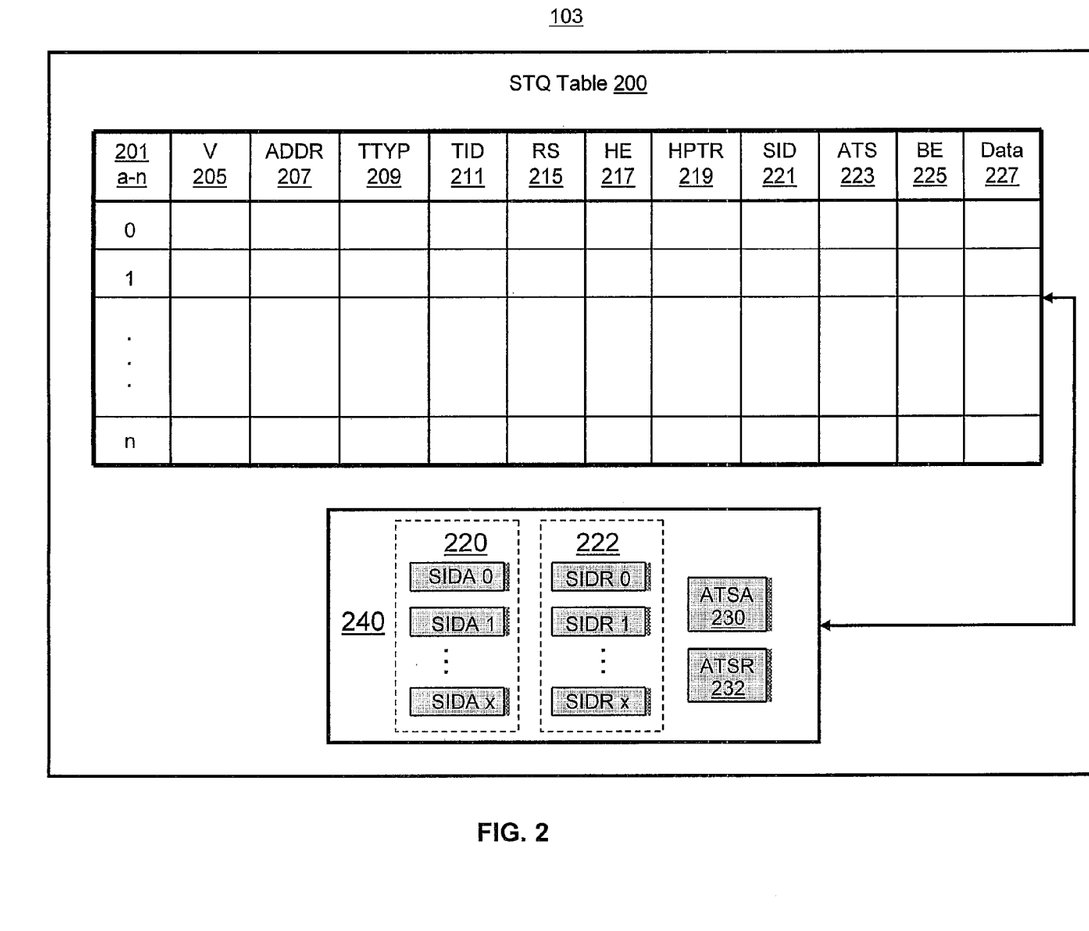
FIG. 2 is a block diagram representing components of a STQ utilized to complete data entry processing operations, in accordance with one embodiment of the invention.

With reference now to FIG. 2, which illustrates the major functional components of STQ 103 utilized to complete data store operations. STQ 103 comprises STQ table 200 and bit manager 240. STQ 103 is utilized for temporarily storing and gathering data stores issued by processor 100. STQ table 200 is partitioned into several registers: entry 201(a-n), valid bit 205, address register 207, transaction type (ttyp) register 209, thread identification (TID) 211, recent store (RS) 215, hazard exists (HE) 217, hazard pointer (HPTR) 219, synchronized identification (SID) 221, all-thread-sync (ATS) 223, byte enable register 225, and data register 227. Entry 201a-n is the input of the processor issued stores.

STQ table 200 sends and receives information to and from bit manager 240. Bit manager 240 comprises the following registers: synchronized identification allocation (SIDA, also referred to as SIDA counter 220), synchronized identification retirement (SIDR, also referred to as SIDR counter 222), all-thread-sync allocation (ATSA) 230, and all-thread-sync retirement (ATSR) 232. SIDA 220 and SIDR 222 are counters that include an input for each thread of execution (e.g. 0 to x, where '0' is the initial thread of execution and 'x' is the final thread of execution) being processed. ATS 223, ATSA 230, and ATSR 232 are presented herein as a one bit register; however, ATS 223, ATSA 230, and ATSR 232 may be implemented as a multi-bit vector such as SID 221, SIDA 220, and SIDR 222. Thereby, ATS 223, ATSA 230, and ATSR 232 may be utilized to process multiple all-thread-sync groups within the STQ in addition to thread-sync and regular stores.

In one embodiment, elements within STQ table 200 represent hardware components utilized to complete dependency tracking operations of STQ 103. In order for a store to retire, one criterion is that the store be in a SID group (for a given thread) that is currently being retired by the STQ. Entries that have the same bit value in the field for SID 221, in STQ table 200, are eligible to retire. SIDA counter 220 tracks the sync-ID for each allocated entry of a given thread of execution. SIDR 222 tracks the sync-ID for the store that is eligible to retire for a given thread. The bit within ATSA 230 is recorded, or captured, when the store is allocated (or assigned to the STQ 103). The bit of ATSR 232 may be modified as synchronized stores retire.

In one embodiment, the STQ may process entry allocations according to the sync-group. When one or more "regular" stores (non-thread-sync and non-all-thread-sync) are allocated for entrance into the STQ, the bit(s) of SIDA 220 (for the current thread) and of ATSA 230 are captured. When one or more thread-sync stores are allocated for entrance into the STQ, SQP utility 123 sets the bit of HE 217, for the new entry, equal to one. The bit of RS 215 is cleared. The bit(s) of SIDA 220, for the current thread and the bit of ATSA 230 are captured, and SQP utility 123 increments the bit(s) of SIDA 220 for the current thread. When one or more all-thread-sync stores are allocated for entry into the STQ, SQP utility 123 sets the bit of HE 217 equal to one, then clears the bit of RS 215 (for the current entry), captures the bit of ATSA 232, and inverts the bit of ATSA 232.

In one embodiment, the STQ may process retirement of stores according to the sync-group in which the store is associated. When a sync-group has a regular store, the sync-group may retire if one or more regular stores within the sync group satisfy the following criterion: (1) the bits within SID 221 match the bits of SIDR 222 (for the given thread); and (2) the bit of ATS 223 for the store matches the bit of ATSR 232. Thereby when the bits of SID 221 equal the bits of SIDR 222, and the bit of ATS 223 equals the bit of ATSR 232, the sync-group may retire without waiting for an older sync-group to retire (however, the retiring store may have to wait for an older store).

In one embodiment, the STQ may process retirement of a sync-group comprising a thread-sync store. The bit of HE 217 is cleared for a thread-sync store if no other valid stores within the STQ have equivalent bits values in the field of SID 221. If the bit of HE 217 is zero, and the bits of SID 221 match the bits of SIDR 222 for the thread-sync store, and the bit of ATS 223 matches the bit of ATSR 232, the sync-group is eligible to retire. When a STQ entry containing a thread-sync retires, the sync-group is eligible to retire; SIDR 222 (for the thread) is incremented to the next value, so that subsequent sync-groups may retire.

In one embodiment, "increment" for SIDR 222 and/or SIDA 220 may not be a standard "plus one" increment. That is, the increment may involve some random assignment of a new value, different from the previous value. Alternatively, the incrementing may be completed by a "one hot" vector, which makes it easier to determine when to clear the HE bit. With such an implementation, the increment may require an increase in the number of the bits within SIDA 220 and SIDR 222, such as adding one or more bits. Incrementing the number of bits of SIDR 222 and/or SIDA 220 may require increasing the register of SIDR 222 and/or SIDA 220. As an alternatively to increasing the width (or number of bits within) the registers, the number of permitted, concurrent sync groups may be limited to the number of bits in the SID.

In one embodiment, the STQ may process retirement of a sync-group comprising an all-thread sync store. When a sync-group has an all-thread-sync store, the sync-group may retire if the bit of ATS 223 (for the store), match the bit of ATSR 232. If no other valid entries (as indicated by valid bit 205) have the same bit within the field of ATS 223, then the bit of HE 217 is cleared. When a STQ entry containing a thread-sync retires, the sync-group is eligible to retire; the bit of ATSR 232 is inverted.

Figure 3:
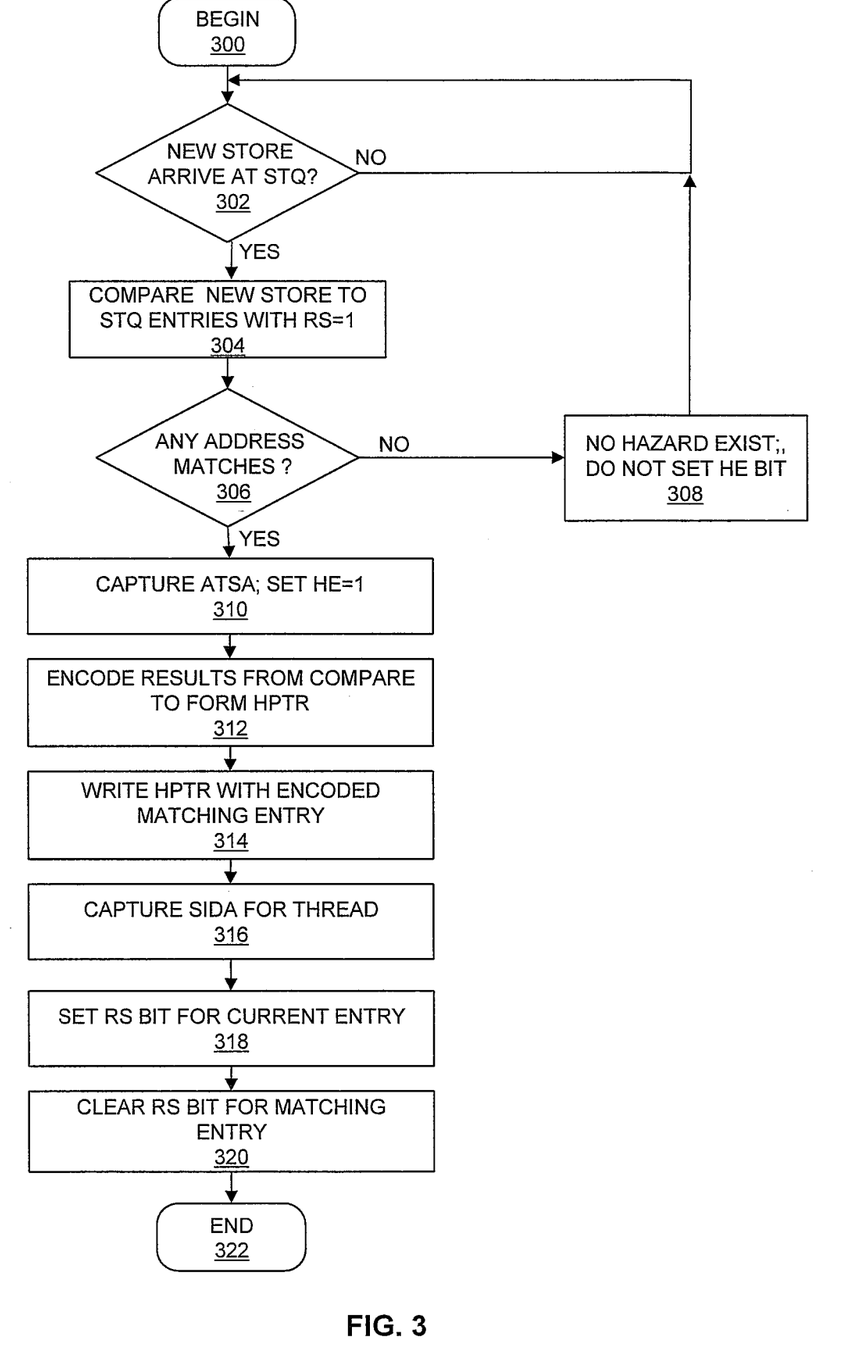
FIG. 3 is a logic flow chart for dependency tracking when a new store arrives at a STQ, according to one embodiment of the invention.
Figure 4:
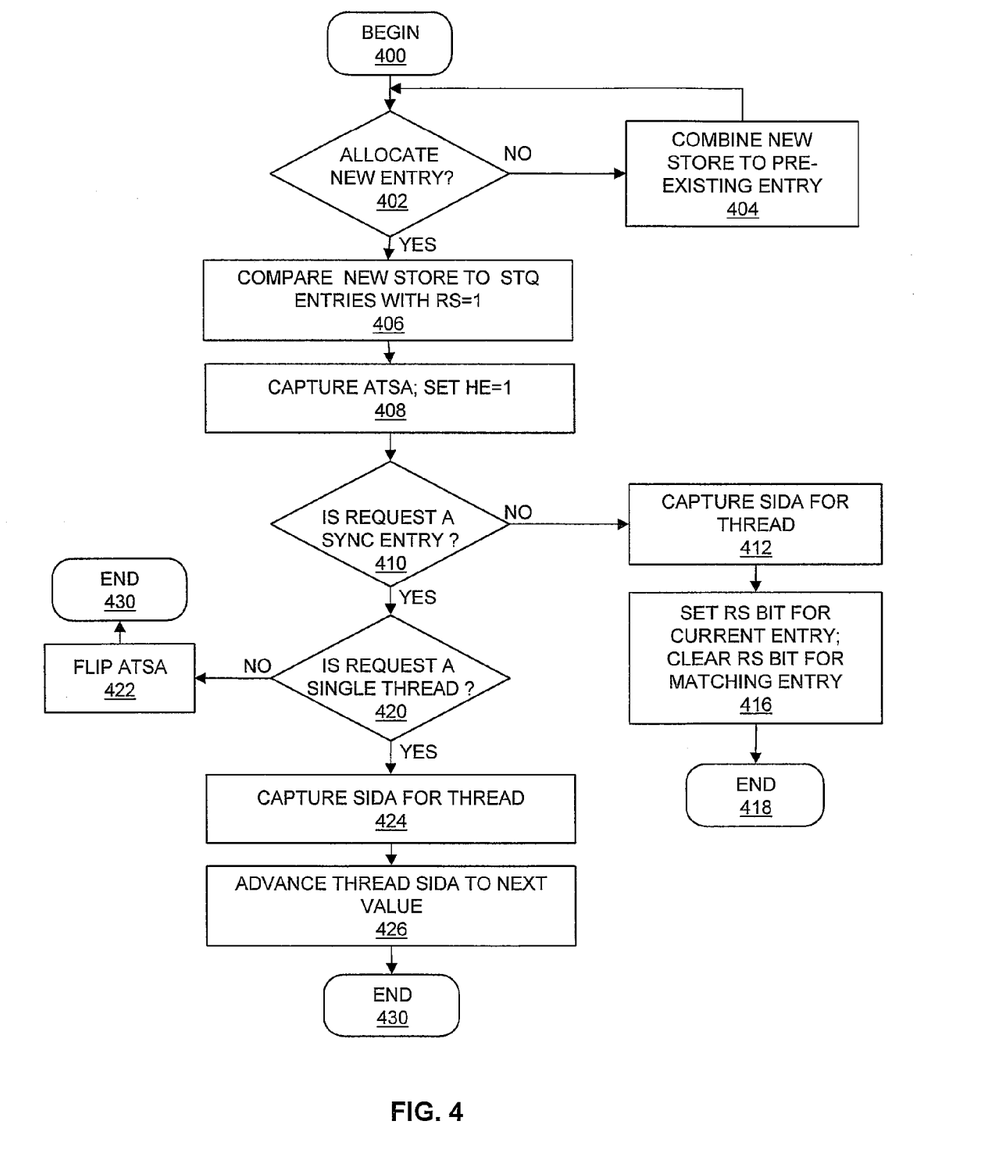
FIG. 4 is a logic flow chart for dependency tracking when a new store is allocated within a STQ, in accordance with one embodiment of the invention.
Figure 5:
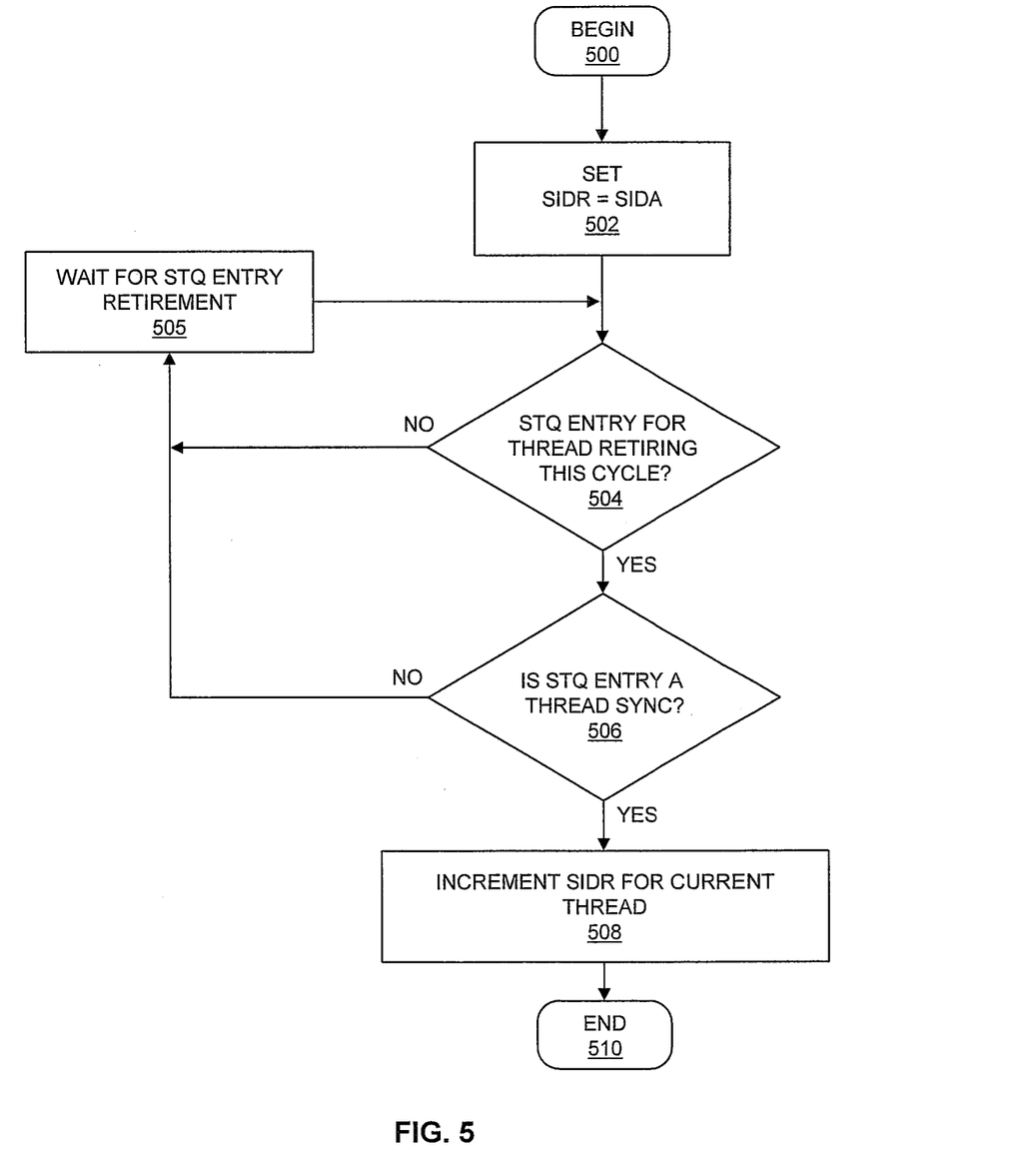
FIG. 5 is a logic flow chart for updating the synchronized identification retirement (SIDR) counter within a STQ, according to one embodiment of the invention.
Figure 6:
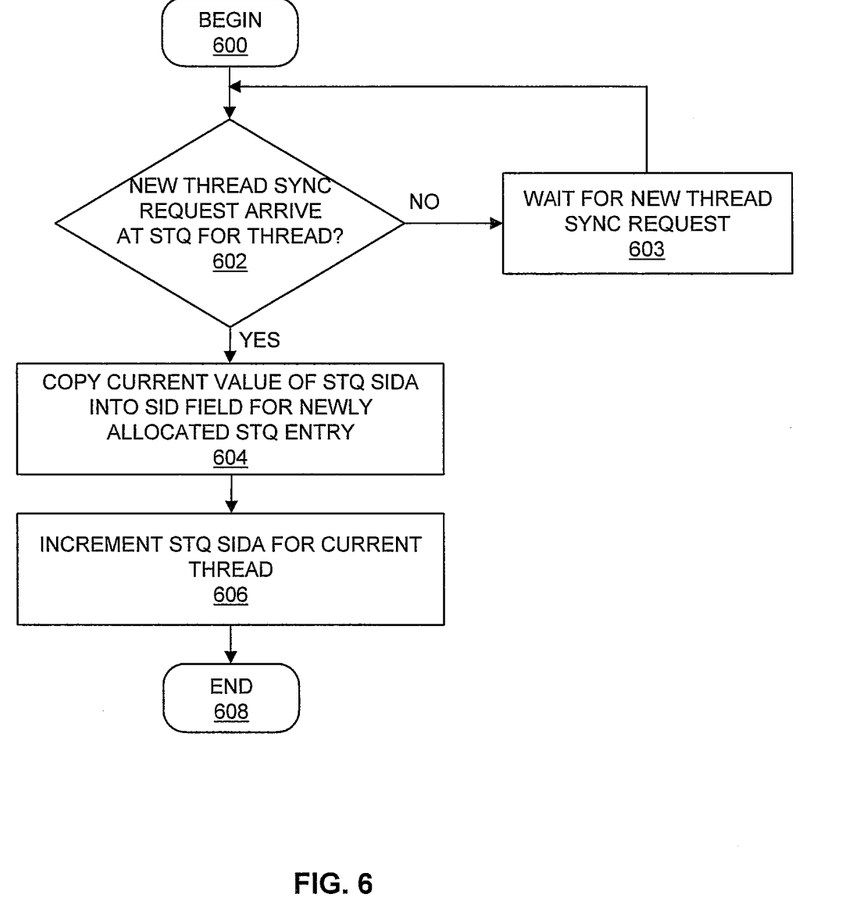
FIG. 6 is a logic flow chart for updating the synchronized identification allocation (SIDA) counter within a STQ, in accordance with one embodiment of the invention.
Figure 7:
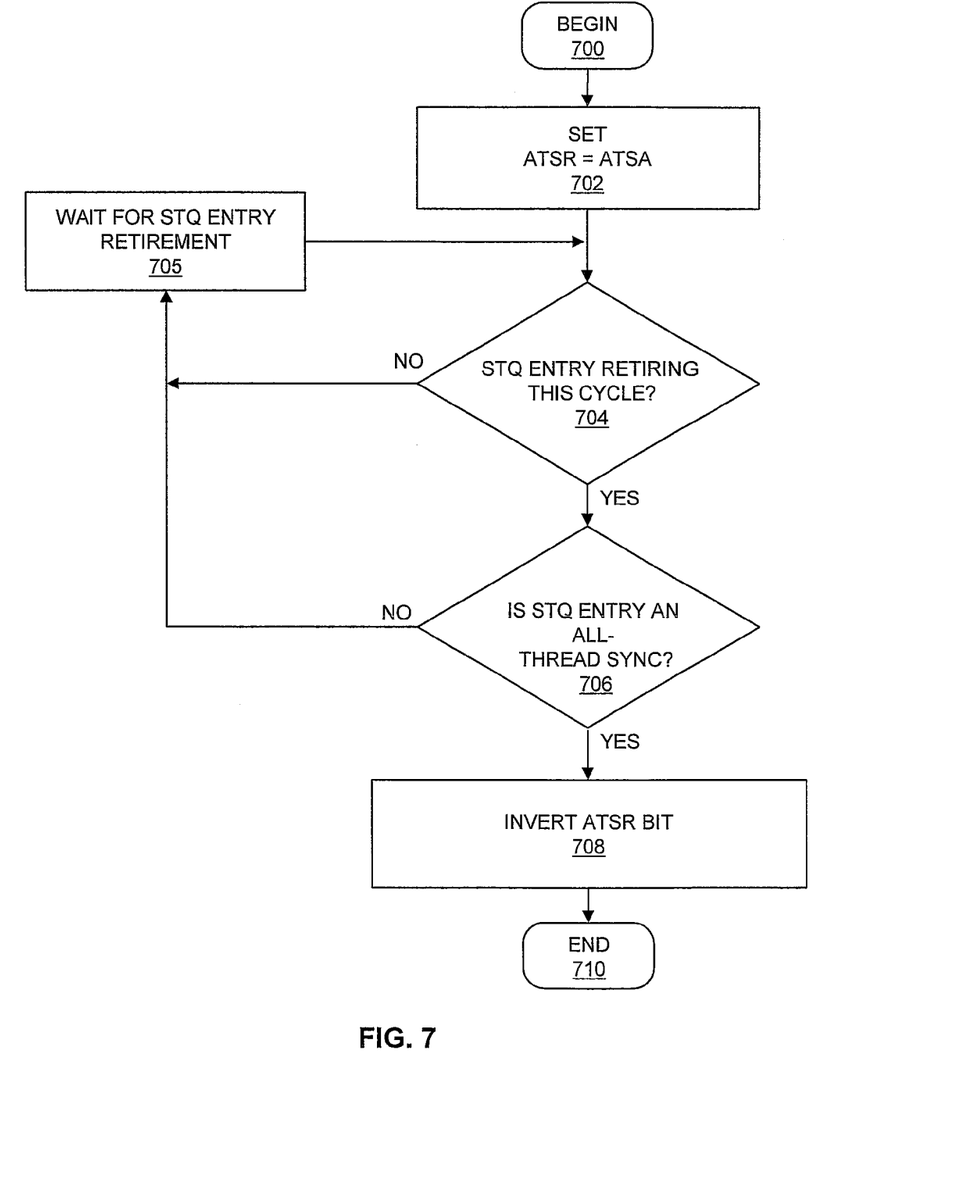
FIG. 7 is a logic flow chart for updating the all-thread-sync allocation (ATSA) bit within a STQ, according to one embodiment of the invention.
Figure 8:
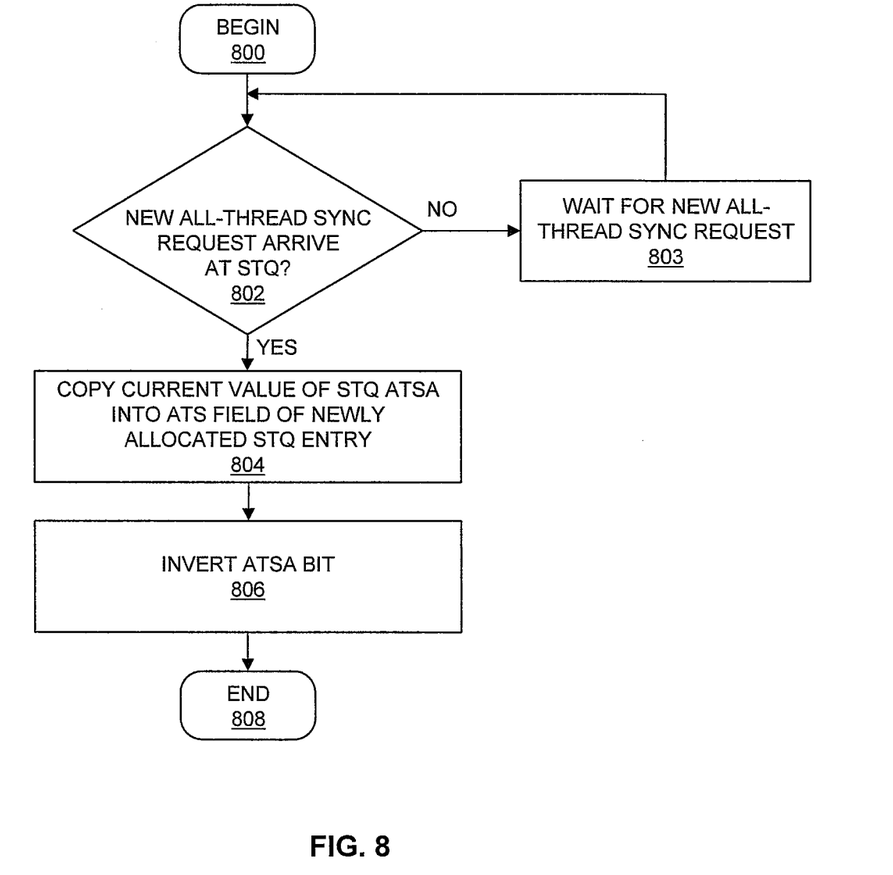
FIG. 8 is a logic flow chart for updating the all-thread-sync retirement (ATSR) bit within a STQ, in accordance with one embodiment of the invention.
Figure 9:
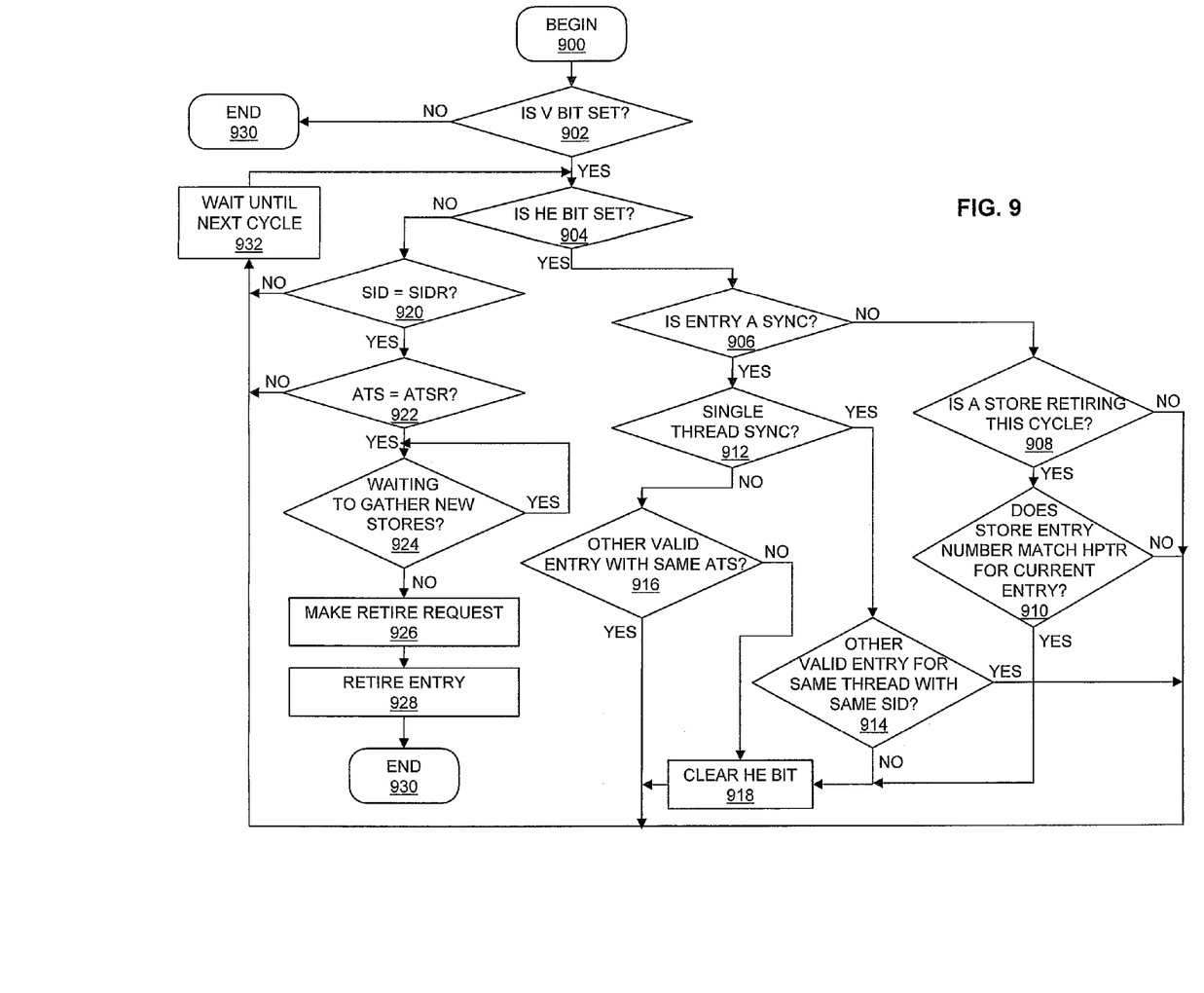
FIG. 9 is a logic flow chart for processing STQ entry retirement, according to one embodiment of the invention.

FIGS. 3-9 are flow charts illustrating various methods by which the above processes of the illustrative embodiments are completed. Although the methods illustrated in FIGS. 3-8 may be described with reference to components shown in FIGS. 1-2, it should be understood that this is merely for convenience and alternative components and/or configurations thereof can be employed when implementing the various methods. FIG. 3 describes the method for tracking dependency within a sync-group when a new store arrives at STQ 103 (FIG. 1). The method for dependency tracking when a new store is allocated within STQ 103 (FIG. 1) is described by FIG. 4. FIG. 5 describes the method for updating SIDR counter within STQ 103. The method for updating the SIDA counter within STQ (103) is described in FIG. 6. FIG. 7 describes the method for updating the ATSR bit within STQ 103, while the method for updating the ATSA bit within STQ 103 is described in FIG. 8. FIG. 9 then describes the method for retiring entries from the STQ. Key portions of the methods may be completed by SQP utility 123 of STQ 103. The methods are thus described from the perspective of SQP utility 123.

The process of FIG. 3 begins at initiator block 300 and proceeds to block 302, at which SQP utility (123) detects that a new store has arrived in the STQ. At block 304, SQP utility 123 compares the address of the new store to the address of existing STQ entries that have a RS value equal to one. At block 306 a decision is made whether there are additional address matches present in the STQ. If no additional address matches are present in the STQ, no hazard exists; therefore, the HE bit is not set. If an additional address match is present in the STQ, the process continues to block 310. At block 310, the bit of ATSA 230 (FIG. 2) is captured (or recorded in the ATSA register), and HE (217) is set equal to one. The results from the new store compare (at block 304) are encoded to form the value for HPTR, at block 312. At block 314, the value for HPTR is written as the encoded value for the matching entry. The bits of SIDA, for the current thread of execution, are captured at block 316. At block 318, the RS bit for the current entry is set equal to one. The RS bit for the matching entry is cleared (unless the store is a thread-sync or all-thread-sync store), at block 320. The process ends at block 322.

When the process of FIG. 4 begins at block 400, a pre-existing address match is present in the STQ or the current store is a synchronized store. At block 402, a decision is made whether to allocate a new entry to the STQ. If a new entry is not allocated to the STQ, the process continues to block 404, where the new store and a pre-existing store with matching addresses are combined into a single entry. If a new entry is allocated, the process continues to block 406. At block 406, the new store is compared to STQ entries that have RS values equal to one. The process continues to block 408, where the ATSA bit is captured and the HE bit is set equal to one. A decision is made at block 410, whether the entry request is a synchronized (sync) entry. If the request is a sync entry, the process continues to block 420. If the request is not a sync entry, the process continues to block 412. At block 412, the SIDA bits are captured for the current thread. At block 416, the RS bit for the current entry is set, and the RS bit for the older matching entry is cleared. The process ends at block 418.

At block 420 a decision is made whether the new store is a thread-sync or all-thread sync. If the new store is a thread-sync, the process continues to block 422 where the bit of ATSA is flipped, or inverted. The process ends at block 430. If the new store is a thread-sync, the SIDA bits are captured for the current thread, at block 424. At block 426, the SIDA bits (for the current thread) are incremented to the next value. The process ends at block 430.

The process of FIG. 5 begins at block 500, after system reset, but before the first store enters the STQ. At block 502, the bits of SIDR are set equal to the bits of SIDA. At block 504, a decision is made whether a store for the current thread is retiring in the current cycle. If there is no store retiring during the current cycle, the process continues to block 505, where the SQP utility waits for the retirement of an STQ entry in the current cycle. If a store is retiring, the process continues to block 506, where a decision is made whether the store is a thread-sync store. If the store is not a thread-sync entry, the process continues to block 505. If the entry is a thread-sync store, the process continues to block 508. At block 508, the bits of SIDR are incremented to the next value for the current thread. The process ends at block 510.

The process for updating the bits of SIDA begins at block 600 of FIG. 6. At block 602 the SQP utility detects that a new thread sync request has arrived at the STQ for the current thread. Once a new thread sync entry has arrived, the process continues to block 604 at which the bits of the SIDA (for current thread) are copied into the SID field for the newly allocated entry. The bits of SIDA for the current thread are incremented, at block 606. The process ends at block 608.

The process of FIG. 7 begins at block 700 after system reset, but before the first store enters the STQ. At block 702, the bit of ATSR is set equal to the bit of ATSA. A decision is made at block 704, whether a STQ entry is retiring during the current cycle. If a STQ entry is not retiring, the SQP utility waits for an entry to retire at block 705. If a STQ entry is retiring, the process continues to block 706. At block 706, a decision is made whether the STQ entry retiring is an all-thread sync entry. If the STQ entry is not an all-thread sync entry the process continues to block 705. If the STQ entry is an all-thread sync entry, the process continues to block 708 where the ATSR bit is inverted. The process ends at block 710.

The process of updating the ATSA bit begins at block 800 of FIG. 8. At block 802, the utility detects that a new all-thread sync request has arrived at the STQ. Once a new all-thread sync request is at the STQ, the process continues to block 806. At block 804, the bit of the ATSA is copied into the ATS field for the newly allocated STQ entry. The bit of ATSA is inverted, at block 806, and the process ends at block 808.

The process for retiring a store from the STQ, which is illustrated by FIG. 9, begins at block 900. At block 902 a decision is made whether the 'V' bit, or valid bit, is present for the entry being processed for retirement. If the valid bit is present, the process continues to block 904, where a decision is made whether the HE bit is present. If the valid bit is not present, the process ends at block 930. If the HE bit is present (at block 904), the process continues to block 906, where a decision is made whether the entry is a "sync", or synchronized entry. If the HE bit is not present the process continues to block 920. At block 906, if the entry is a synchronized entry, the process continues to block 912, where a decision is made whether the synchronized entry is a single thread synchronized entry. If the entry is not a synchronized entry, the process continues to block 908, where a decision is made whether another store is retiring during the current cycle. If a store is not retiring during the current cycle, the process of the SQP utility continues to block 932, where the process waits until the next cycle to process retirement for the entry.

If, at block 908, a store is retiring during the current cycle the process continues to block 910. At block 910, a decision is made whether the store's entry number matches the HPTR for the current entry. If the store's entry number does not match the HPTR for the current entry, the process continues to block 932, where the entry waits until the next cycle to process. If the store's entry number matches the HPTR for the current entry, the process continues to block 918, where the HE bit is cleared.

Returning to block 912, if the entry is a single thread synchronized entry, the process continues to block 914. If the entry is not a single thread synchronized entry the process continues to block 916. At block 914, a decision is made whether there is another valid entry for the same thread with the same SID. If there is another valid entry for the same thread with the same SID, the process continues to block 932, where the entry waits for the next cycle to process. If there is not another valid entry for the same thread with the same SID, the HE bit for the entry is cleared. No further hazard exists; therefore, the process continues to block 932, where the entry waits for the next cycle to process.

At block 916, a decision is made whether the STQ has any other valid entries with the same ATS as the current entry. If there are other entries within the STQ with the same ATS, the process continues to block 932. If there are no other entries within the STQ with the same ATS, the process continues to block 918, where the HE bit is cleared. The process proceeds to block 932.

When the process is at block 920, a decision is made whether the bits of the SID are equal to the bits of the SIDR. If the bits of SID are equal to the bits of SIDR, the process continues to block 922. If the bits of SID are not equal to the bits of SIDR, the process continues to block 932. A decision is made at block 922, whether the ATS bit is equal to the ATSR bit for the entry. If the ATS bit is equal to the ATSR bit for the entry, the process continues to block 924. If the ATS bit is not equal to the ATSR bit for the entry the process continues to block 932. At block 924, a decision is made whether the STQ is waiting to gather new stores. If the STQ is waiting to gather new stores, the process waits at block 924, until the STQ is no longer waiting to gather new stores. If the STQ is not waiting to gather new stores, at block 924, the process continues to block 926. At block 926, a command is issued by the SQP utility to retire the current entry. The entry is retired at block 928. The process ends at block 930.

In the flow charts above, one or more of the methods are embodied as a computer program product in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
    receiving a store into a STQ;
    assigning the store a sync identification (SID);
    associating the SID to one or more stores within the STQ, wherein the one or more stores associated with the SID form a sync group;
    determining whether the sync group of the store is dependent on at least one other sync group within the STQ;
    dynamically designating the sync group to retire at a time selected based on whether the sync group is dependent on at least one other sync group in the STQ;
    selecting the store to retire when the store is associated with a retiring sync group, such that the store retires along with other stores within the sync group identified by the SID; and
    deterministically designating the store in the retiring sync group to retire in an order selected based on whether the store is one of a non-sync store, a thread sync store, and an all-thread sync store.

2. The method of claim 1, wherein said receiving the store into the STQ further comprises:
    associating the store with a thread of execution;
    designating one or more sync ID-allocation (SIDA) bits to the thread of execution to which the store is associated; and
    designating one or more sync ID-retirement (SIDR) bits to the thread of execution when the store is retiring from the STQ.

3. The method of claim 1, wherein said receiving the store into the STQ further comprises:
    assigning one or more all thread sync (ATS) bits to the store;

associating one or more all thread sync-allocation (ATSA) bits to the store when the store is allocated to the STQ; and associating one or more all thread sync-retirement (ATSR) bits to the store when the store is retiring from the STQ.

4. The method of claim 3, wherein when the store is a non-sync store, the method further comprises:

deterministically retiring the sync group when the SID bits of the non-synchronized store within the sync group matches the SIDR bits for the thread of execution of the retiring sync group, and the ATS bits associated with the store matches the ATSR bits during entry retirement;

retiring an older store from the retiring sync group in the STQ when the older store is of the same thread of execution and has the same SID bits as a newer store; and retiring an older sync group when the sync group with the non-sync store has one or more of the following properties: (a) the SID bits of the store do not match the SIDR bits for the thread of execution, and (b) the ATS bits of the store do not match the ATSR bits during entry retirement.

5. The method of claim 3, wherein when the store is a thread sync store, the method further comprises:

deterministically retiring the sync group when the SID bits of the thread sync store within the sync group matches the SIDR bits for the thread of execution of the retiring sync group, and when the ATS bits associated with the store matches the ATSR bits during entry retirement; and incrementing the SIDR bits for the thread of execution of the retiring sync group, when the sync group with the thread synchronized store retires from the STQ.

6. The method of claim 3, wherein when the store is an all-thread sync store, the method further comprises:

deterministically retiring the sync group when the ATS bits of the all-thread sync store within the retiring sync group matches the ATSR bits; and incrementing the ATSR bits when the sync group with the all-thread synchronized store, retires from the STQ.

7. A processor chip comprising:

a processor component;

a store queue (STQ) coupled to the processor component;

logic associated with the STQ, which logic configures the STQ to:

receive a store into a STQ;

assign the store a sync identification (SID);

associate the SID to one or more stores within the STQ, wherein the one or more stores associated with the SID form a sync group;

determine whether the sync group of the store is dependent on at least one other sync group within the STQ;

dynamically designate the sync group to retire at a time selected based on whether the sync group is dependent on at least one other sync group in the STQ;

select the store to retire when the store is associated with a retiring sync group, such that the store retires along with other stores within the sync group identified by the SID; and deterministically designate the store in the retiring sync group to retire in an order selected based on whether the store is one of a non-sync store, a thread sync store, and an all-thread sync store.

8. The processor chip of claim 6, wherein said logic for receiving the store into the STQ further comprises logic that:

associates the store with a thread of execution;

designates one or more sync ID-allocation (SIDA) bits to the thread of execution to which the store is associated;

designates one or more sync ID-retirement (SIDR) bits to the thread of execution when the store is retiring from the STQ;

assigns one or more all thread sync (ATS) bits to the store;

associates one or more all thread sync-allocation (ATSA) bits to the store when the store is allocated to the STQ; and associates one or more all thread sync-retirement (ATSR) bits to the store when the store is retiring from the STQ.

9. The processor chip of claim 8, wherein when the store is a non-sync store, the logic further comprises logic that:

deterministically retires the sync group when the SID bits of the non-synchronized store within the sync group matches the SIDR bits for the thread of execution of the retiring sync group, and the ATS bits associated with the store matches the ATSR bits during entry retirement;

retires an older store from the retiring sync group in the STQ when the older store is of the same thread of execution and has the same SID bits as a newer store; and retires an older sync group when the sync group with the non-sync store has one or more of the following properties: (a) the SID bits of the store do not match the SIDR bits for the thread of execution, and (b) the ATS bits of the store do not match the ATSR bits during entry retirement.

10. The processor chip of claim 8, wherein when the store is a thread sync store, the logic further comprises logic that:

deterministically retires the sync group when the SID bits of the thread sync store within the sync group matches the SIDR bits for the thread of execution of the retiring sync group, and when the ATS bits associated with the store matches the ATSR bits during entry retirement; and increments the SIDR bits for the thread of execution of the retiring sync group, when the sync group with the thread synchronized store retires from the STQ.

11. The processor chip of claim 8, wherein, when the store is an all-thread sync store, the logic further comprises logic that:

deterministically retires the sync group when the ATS bits of the all-thread sync store within the retiring sync group matches the ATSR bits; and increments the ATSR bits when the sync group with the all-thread synchronized store, retires from the STQ.

12. A data processing system comprising:

a memory hierarchy;

a processor coupled to the memory hierarchy;

a store queue (STQ) coupled to the processor;

logic associated with the STQ, which logic configures the STQ to:

receive a store into a STQ;

assign the store a sync identification (SID);

associate the SID to one or more stores within the STQ, wherein the one or more stores associated with the SID form a sync group;

determine whether the sync group of the store is dependent on at least one other sync group within the STQ;

dynamically designate the sync group to retire at a time selected based on whether the sync group is dependent on at least one other sync group in the STQ;

select the store to retire when the store is associated with a retiring sync group, such that the store retires along with other stores within the sync group identified by the SID; and deterministically designate the store in the retiring sync group to retire in an order selected based on whether the store is one of a non-sync store, a thread sync store, and an all-thread sync store.

13. The data processing system of claim 12, wherein said logic for receiving the store into the STQ further comprises logic that:
   associates the store with a thread of execution;
   designates one or more sync ID-allocation (SIDA) bits to the thread of execution to which the store is associated; and
   designates one or more sync ID-retirement (SIDR) bits to the thread of execution when the store is retiring from the STQ.

14. The data processing system of claim 12, wherein said logic for receiving the store into the STQ further comprises logic that:
   assigns one or more all thread sync (ATS) bits to the store;
   associates one or more all thread sync-allocation (ATSA) bits to the store when the store is allocated to the STQ; and
   associates one or more all thread sync-retirement (ATSR) bits to the store when the store is retiring from the STQ.

15. The data processing system of claim 14, wherein when the store is a non-sync store, the logic further comprises logic that:
   deterministically retires the sync group when the SID bits of the non-synchronized store within the sync group matches the SIDR bits for the thread of execution of the retiring sync group, and the ATS bits associated with the store matches the ATSR bits during entry retirement;
   retires an older store from the retiring sync group in the STQ when the older store is of the same thread of execution and has the same SID bits as a newer store; and
   retires an older sync group when the sync group with the non-sync store has one or more of the following properties: (a) the SID bits of the store do not match the SIDR bits for the thread of execution, and (b) the ATS bits of the store do not match the ATSR bits during entry retirement.

16. The data processing system of claim 14, wherein when the store is a thread sync store, the logic further comprises logic that:
   deterministically retires the sync group when the SID bits of the thread sync store within the sync group matches the SIDR bits for the thread of execution of the retiring sync group, and when the ATS bits associated with the store matches the ATSR bits during entry retirement; and
   increments the SIDR bits for the thread of execution of the retiring sync group, when the sync group with the thread synchronized store retires from the STQ.

17. The data processing system of claim 14, wherein, when the store is an all-thread sync store, the logic further comprises logic that:
   deterministically retires the sync group when the ATS bits of the all-thread sync store within the retiring sync group matches the ATSR bits; and
   increments the ATSR bits when the sync group with the all-thread synchronized store, retires from the STQ.

* * * * *